US008951175B2

(12) United States Patent
Pirovano

(10) Patent No.: US 8,951,175 B2
(45) Date of Patent: Feb. 10, 2015

(54) SECTION MEMBER DRILLING OR MILLING MACHINE

(75) Inventor: Alessandro Pirovano, Varese (IT)

(73) Assignee: Ficep S.p.A., Gazzada Schianno (IT)

( * ) Notice: Subject to any disclaimer, the term of this patent is extended or adjusted under 35 U.S.C. 154(b) by 429 days.

(21) Appl. No.: 13/429,862

(22) Filed: Mar. 26, 2012

(65) Prior Publication Data

US 2013/0247347 A1  Sep. 26, 2013

(51) Int. Cl.
*B23Q 3/157* (2006.01)
*B23C 1/027* (2006.01)
*B23Q 1/01* (2006.01)

(52) U.S. Cl.
CPC ............. *B23Q 3/15706* (2013.01); *B23Q 1/01* (2013.01); *B23C 1/027* (2013.01); *B23Q 1/012* (2013.01)
USPC .............. 483/55; 409/235; 409/212; 408/234

(58) Field of Classification Search
CPC ........ B23B 39/006; B23Q 1/012; B23Q 1/01; B23Q 1/015; B23Q 1/017; B23Q 3/15706; B23C 1/002; B23C 1/025; B23C 1/027
USPC .................. 409/202, 206, 212, 235; 408/234; 29/26 A, 26 R; 483/54, 55, 56, 57
See application file for complete search history.

(56) References Cited

U.S. PATENT DOCUMENTS

| RE26,393 | E | * | 5/1968 | Daugherty | 409/118 |
|---|---|---|---|---|---|
| 5,988,959 | A | * | 11/1999 | Sugata | 409/141 |
| 6,551,038 | B1 | * | 4/2003 | Sugata et al. | 409/134 |
| 7,437,816 | B1 | * | 10/2008 | Kuo | 29/563 |
| 7,509,718 | B1 | * | 3/2009 | Mischler et al. | 29/33 P |
| 2010/0008741 | A1 | * | 1/2010 | Colombo et al. | 409/137 |

FOREIGN PATENT DOCUMENTS

DE 102009058649 A1 * 6/2011
JP 59196146 A * 11/1984

* cited by examiner

*Primary Examiner* — Erica E Cadugan
*Assistant Examiner* — Michael Vitale
(74) *Attorney, Agent, or Firm* — Kirschstein et al.

(57) ABSTRACT

A section member drilling or milling machine comprises a machine bed for supporting a workpiece to be drilled, the machine bed including guides for controllably sliding thereon a support comprising precision vertical guides thereon a platform is engaged, the platform comprising parallel horizontal guides slidably supporting a carriage, in turn supporting a cantilever arm, including a driving motor for controllably driving a drilling and milling tool along parallel guides of the cantilever arm.

2 Claims, 2 Drawing Sheets

SECTION MEMBER DRILLING OR MILLING MACHINE

BACKGROUND OF THE INVENTION

The present invention relates to a section member drilling or milling machine.

As it is known in the prior art, parallel sides of section members, having for example a double-T shape, are drilled in a controlled and very accurate manner, for assembling the section members to other section members to provide, by a bolted connection, a desired construction.

In the prior art a support is also known supporting a drilling, respectively a milling, unit, the support being adapted to slide along sliding guides having a comparatively large extension and arranged parallel to the section member being drilled.

This prior sliding support comprises moreover parallel guides therealong the drilling and milling unit is controllably driven in a vertical plane.

A drawback of the above prior device is that the support assembly has a comparatively large weight and, accordingly, its sliding movement on the horizontal guides, having a comparatively large length, requires a substantial effort and, moreover, a large time and, in addition, the drilling, respectively milling tool precision is not always satisfactory.

In addition, because of the prior milling device inertia, it is not possible to engrave in the section member body symbols such as trademarks or alphanumeric wordings, for facilitating, for example, the end section member assembling step.

SUMMARY OF THE INVENTION

Accordingly, the object of the present invention is to overcome the above mentioned prior art drawbacks and provide a novel section member drilling, respectively milling machine allowing the drilling or milling tool to be driven, with a controlled high speed movement, both in a vertical and in a horizontal driving plane.

According to the invention, the above object is achieved by a section member drilling or milling machine, comprising a machine bed for supporting a workpiece to be drilled, said machine bed including guides for controllably sliding thereon a support, said support comprising precision vertical guides thereon a platform is engaged, characterized in that said platform comprises parallel horizontal guides slidably supporting a carriage, said carriage supporting in turn a cantilever arm including a driving motor for controllably driving a drilling and milling tool along parallel guides of said cantilever arm.

BRIEF DESCRIPTION OF THE DRAWINGS

Further characteristics and advantages of the present invention will become more apparent hereinafter from the following description, dependent claims and accompanying drawings.

The subject matter according to the present invention will be hereinafter disclosed in a more detailed manner with reference to the accompanying drawings, where.

DESCRIPTION OF THE PREFERRED EMBODIMENT

Figure 1:
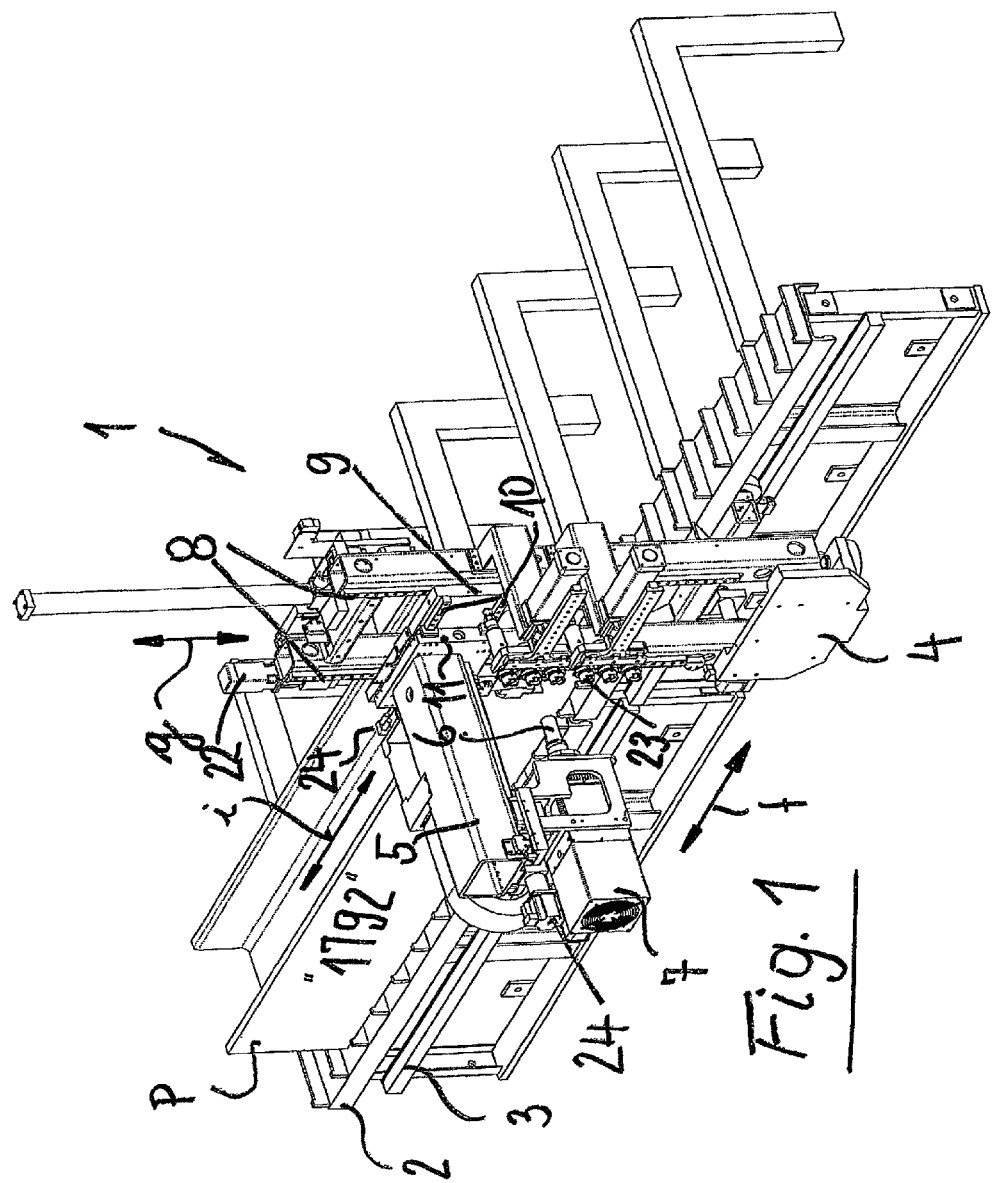
FIG. 1 is a perspective view showing the drilling and milling machine.

The section member drilling or milling machine comprises a machine bed 2, thereon a double-T shape section member P to be machined is arranged.

The machine bed comprises a longitudinal guide 3, for controllably sliding thereon, as indicated by the arrow (f), a support generally indicted by 4.

The support 4 supports a cantilever arm 5, horizontally projecting from said support 4, said arm slidably supporting a drilling, respectively milling tool 6, which is driven by a tool driving motor 7.

The sliding support 4 comprises precision vertical guides 8 therealong is controllably driven, in the direction shown by the double arrow (g), a platform 9, said platform 9 comprising parallel horizontal guides 10 slidably supporting a carriage 11, which in turn supports the cantilever arm 5 together with the tool 6 driving motor 7.

Figure 2:
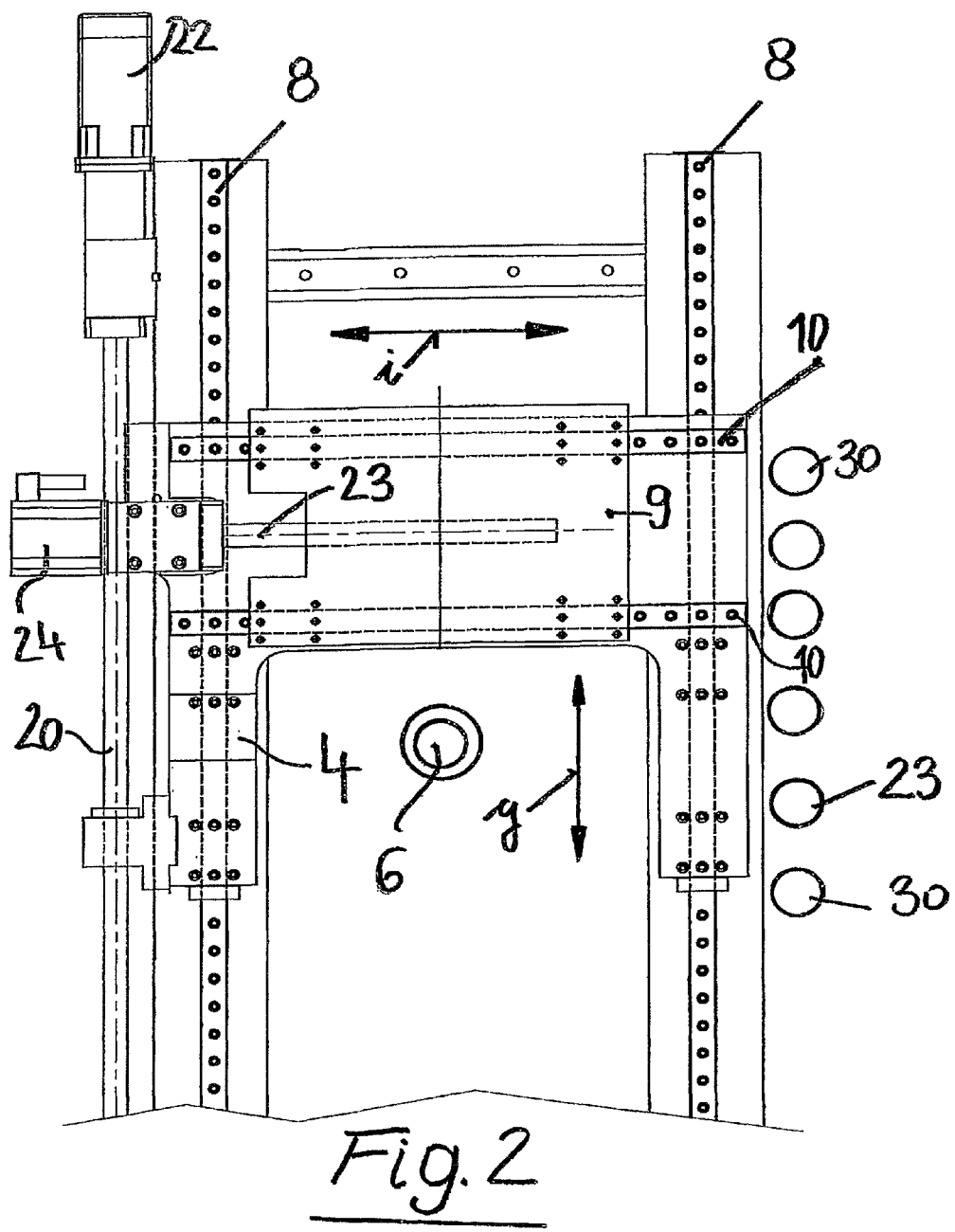
FIG. 2 is a front detail view showing the machine slidable support, including vertically arranged guides and an assembly to be controllably driven along auxiliary horizontal guides.

The above disclosed device is shown by a schematic top plan view in FIG. 2.

It is possible to see in this figure the two parallel guides 8 arranged in a vertical plane allowing the support 4 to perform a controlled movement in a vertical plane as indicated by the double arrow (g).

To perform this controlled movement (g), the support 4 is operatively connected to a precision screw 20, driven by a controllable motor 22 which is in turn operatively connected to a numerical control unit of the drilling and milling machine 1. The support 4 supports moreover said horizontal guides 10 which in turn slidably support the carriage 9, operatively connected to a precision screw 23 driven by a further controllable motor 24 also operatively connected to a conventional machine numerical control unit.

Thus, through said screw 23, the carriage 9 is controllably driven, with a maximum precision for short lengths, in the two directions shown by the double arrow (i).

On a side, and advantageously in parallel to the right guide 8, as is shown in FIG. 2, a magazine 23 including storing seats or recesses for storing several tools 6, to be used in the inventive machine for performing several machining operations on the workpiece 1, is provided.

Thus, on said support 4, coarse movements may be performed along the horizontal guide 3, whereas, by the carriage 11 controllably slidably driven along the guides 10 of the platform 9, precision movements controlled by the driving motor 24 will be performed, thereby allowing to draw on the section member P trademarks or alphanumeric reference marks shown, for example in FIG. 1 by the digits "1792".

The invention claimed is:

1. A machine for machining a flange of an elongated beam member, the machine comprising:
   a stationary machine bed for supporting the beam member during machining of the flange, the machine bed having a longitudinal bed guide extending lengthwise of the beam member along a longitudinal axis;
   a support mounted on and along the bed guide for reciprocal movement in opposite directions along the longitudinal axis, the support having a pair of upright guide rails extending in parallel along an upright axis that is perpendicular to the longitudinal axis;
   a platform being mounted on and along the upright guide rails for reciprocal movement in opposite directions along the upright axis, the platform having a pair of transverse guide rails extending in parallel along the longitudinal axis;

a tool carriage mounted on the transverse guide rails of the platform for movement along the longitudinal axis;

a tool arm mounted in cantilever relationship on the tool carriage and extending along a tool axis that is perpendicular to both the longitudinal axis and the upright axis;

a tool having a tool bit mounted on the tool arm for reciprocal movement in opposite directions along the tool axis; and a drive for reciprocally moving the tool bit in opposite directions along the tool axis toward and away from the flange to be machined.

2. The machine according to claim 1 further comprising a plurality of recesses arranged in a linear row in the support and operative for storing additional tool bits for the tool.

* * * * *